Feb. 11, 1958 M. LANG 2,823,246
DRY CELLS AND METHOD OF MAKING THE SAME
Filed Oct. 25, 1954 3 Sheets-Sheet 1
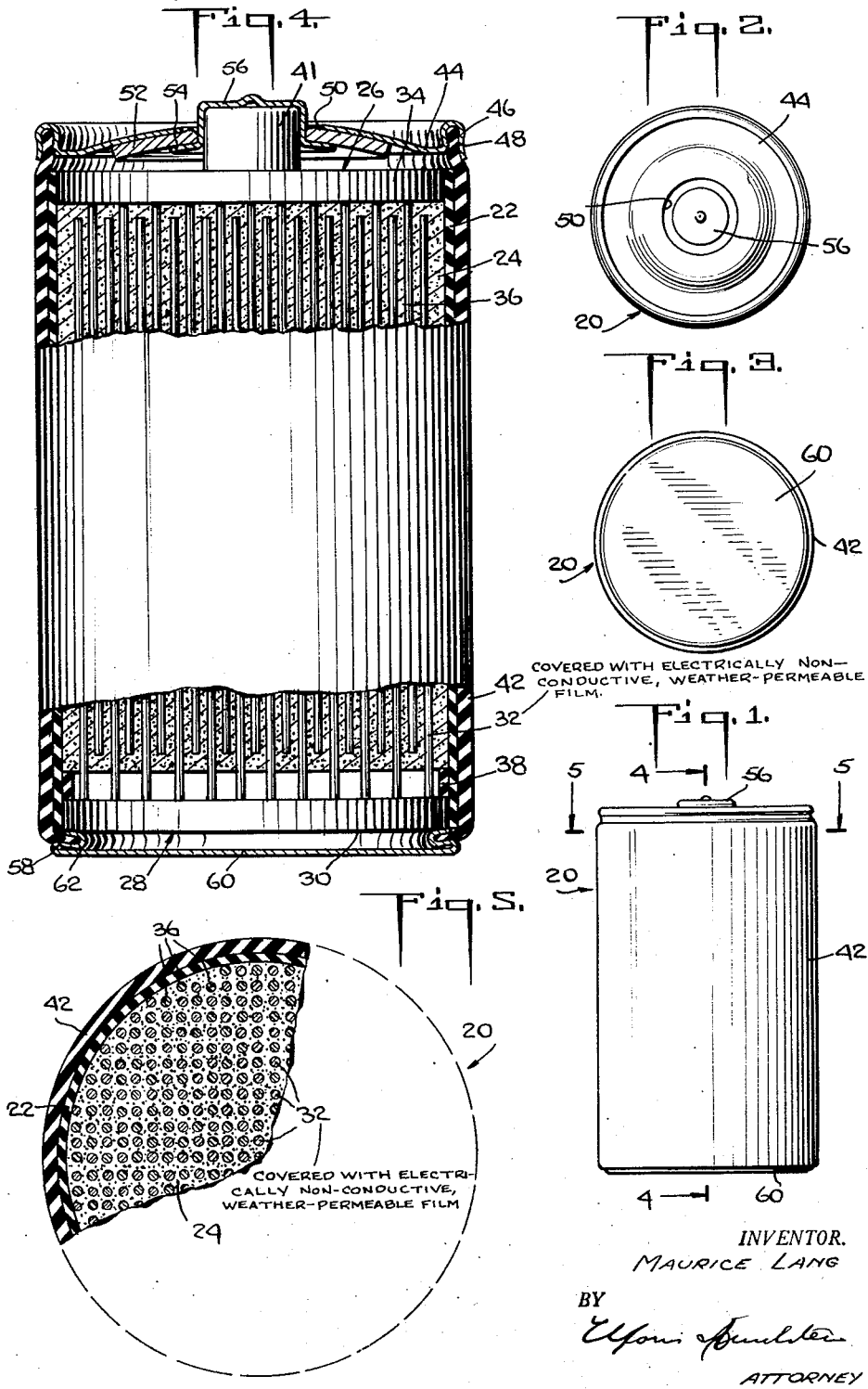
INVENTOR.
MAURICE LANG
BY
ATTORNEY

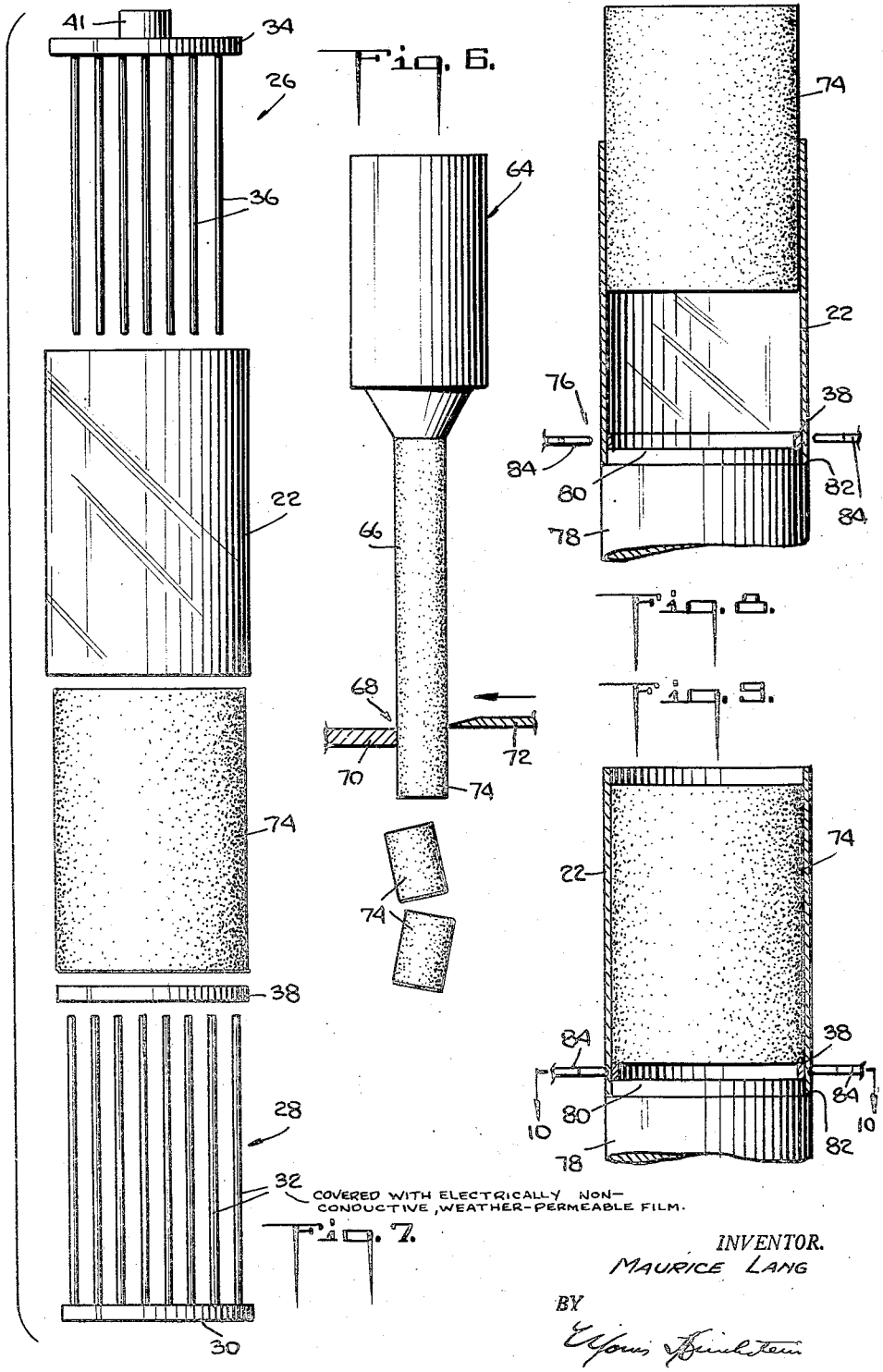

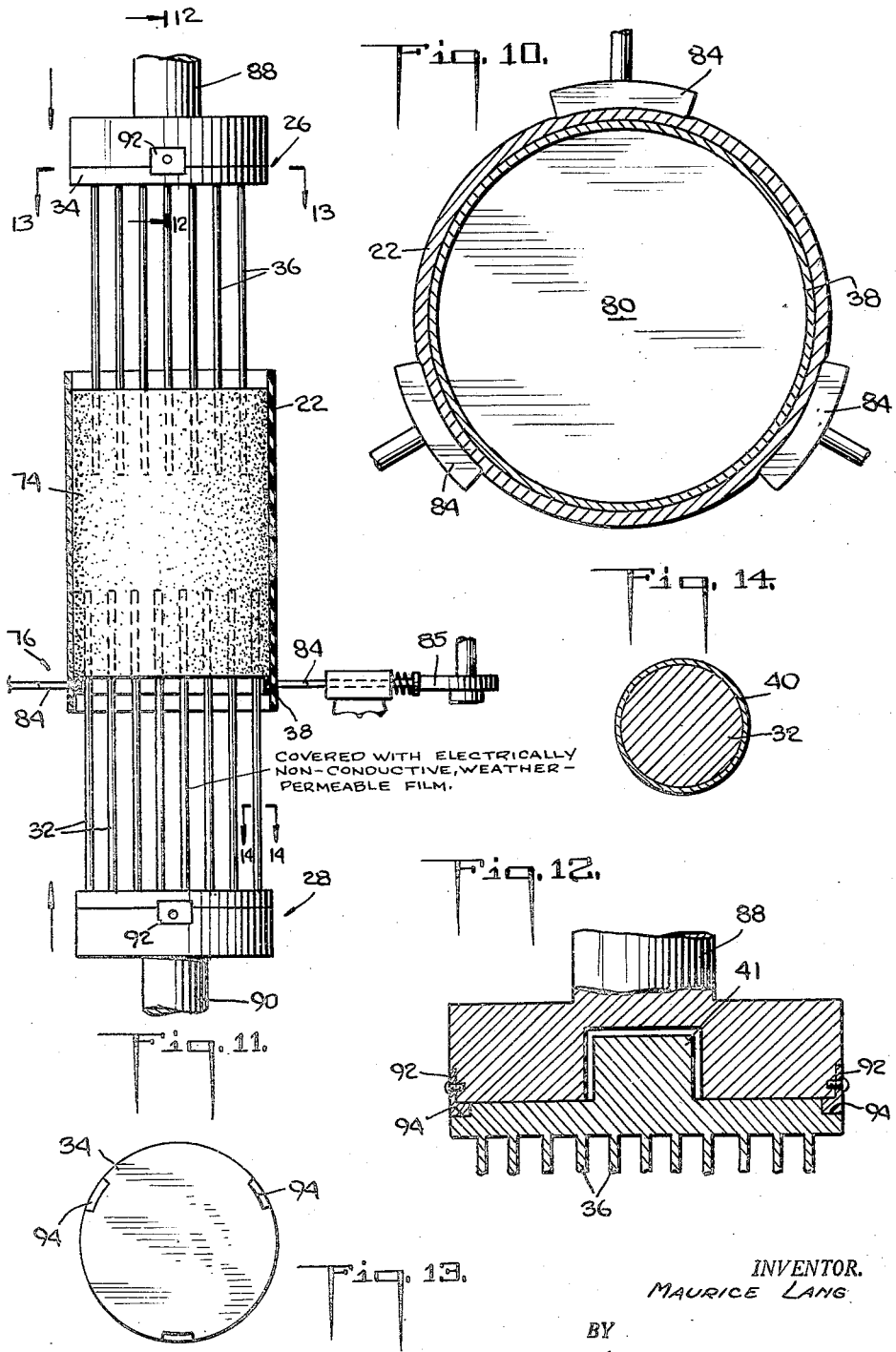

United States Patent Office 2,823,246
Patented Feb. 11, 1958

2,823,246

DRY CELLS AND METHOD OF MAKING THE SAME

Maurice Lang, Long Beach, N. Y., assignor to United States Electric Mfg. Corp., New York, N. Y., a corporation of New York Application October 25, 1954, Serial No. 464,420

5 Claims. (Cl. 136—107)

This invention relates to dry cells and to a method for making the same.

Although the invention will be shown hereinafter as embodied in a type of dry battery commonly used in a flashlight, i. e. an elongated cylinder, it is to be understood that such battery has been disclosed and described by way of example only, and that the invention can be embodied in cells adapted to be used in other types of batteries as well, for example, a flat cell.

It is an object of my invention to provide a dry cell having a lower internal resistance and a larger capacity (ampere-hours) than a conventional dry cell of the same physical size having electrodes of the same materials.

It is another object of my invention to provide a novel cell of the character described whose construction is radically different from that of a conventional dry cell, being particularly designed for manufacture by low cost mass production methods which utilize comparatively few skilled workers.

It is another object of my invention to provide a dry cell of the character described in which, despite its increased capacity, the electrodes are very close to one another and present abnormally large working surfaces.

Other objects of my invention will in part be obvious and in part will be pointed out hereinafter.

My invention accordingly consists in the features of construction, combinations of elements, arrangement of parts and series of steps which will be exemplified in the device and method hereinafter described and of which the scope of application will be indicated in the appended claims.

In the accompanying drawings in which is shown one of the various possible embodiments of my invention, Fig. 1 is a side elevational view of a battery constructed in accordance with my present invention;

Fig. 2 is a top view of the battery;

Fig. 3 is a bottom view of the battery;

Fig. 4 is an enlarged central vertical sectional view through the battery, the same being taken substantially along the line 4—4 of Fig. 1;

Fig. 5 is an enlarged transverse sectional view through the battery, the same being taken substantially along the line 5—5 of Fig. 1;

Fig. 6 is a top view in partial section of a machine for making depolarizing slugs;

Fig. 7 is an exploded view of the principal parts of the battery prior to assembly thereof;

Fig. 8 is a sectional view through a cell assembling machine, the same being illustrated during insertion of a depolarizing slug;

Fig. 9 is a view similar to Fig. 8, illustrating the machine after the slug has been inserted;

Fig. 10 is an enlarged sectional view taken substantially along the line 10—10 of Fig. 9;

Fig. 11 is a view similar to Fig. 8, but illustrating the machine during insertion of the electrodes;

Fig. 12 is an enlarged sectional view taken substantially along the line 12—12 of Fig. 11;

Fig. 13 is a sectional view taken substantially along the line 13—13 of Fig. 11; and Fig. 14 is an enlarged transverse sectional view through one of the fingers of the zinc electrode, the same being taken substantially along the line 14—14 of Fig. 11.

In general, I carry out my invention by providing each electrode of a dry cell, e. g. the zinc and carbon electrodes of a Leclanche cell, with a large number of slender elongated fingers which are imbedded within the pasty mass interposed between the electrodes, e. g. the depolarizing bobbin of the Leclanche cell. The fingers of the different electrodes extend into the mass from opposite sides thereof and the fingers of each electrode are located between a pair of immediately adjacent fingers of the other electrode except those fingers at the periphery of the cell. This arrangement greatly increases the available electrode surface and substantially reduces the interelectrode space, thereby lowering the internal resistance of the cell.

More specifically, referring to Figs. 1 through 5, the reference numeral 20 denotes a Leclanche type flashlight battery consisting of a single dry cell. The cell includes an internal retaining sleeve 22 of an electrically non-conductive impermeable material as, for example, a synthetic plastic, or wax, or resin impregnated paper or cloth. Said material is chemically inert to the substances present in the battery. I prefer to use a thermoplastic due to the ease with which it can be made in tubular form by extrusion. A suitable plastic is a polymerized vinyl chloride.

Nested within the sleeve 22 is a cylindrical depolarizing bobbin 24 which extends from near the top to near the bottom of the sleeve, being spaced slightly further from the bottom. The bobbin includes conventional depolarizing mix materials well known to the art and constituting, for example, a predominant portion of manganese dioxide which acts as a depolarizer, some ammonium and zinc chloride which in combination with water function as an electrolyte, and a small proportion of a conductor, as for example, carbon black or graphite, to increase the electrical conductivity of the mass and thereby decrease the internal resistance of the cell. These materials are thoroughly mixed and are dampened, for example with 20% of their weight of water, so as to render the mix somewhat plastic for a reason which will be pointed out hereinafter.

The battery has two electrodes, to wit, a carbon electrode 26 and a zinc electrode 28.

The zinc electrode comprises a disc 30 of the same shape as the inside of the sleeve 22, being snugly fitted therein. The lower surface of the disc is substantially flush with the lower end of the sleeve. The disc is formed in one piece with a large number of elongated slender fingers 32 extending upwardly from the disc, said fingers being parallel to one another and perpendicular to the disc. The fingers are arranged close together. By way of example, a typical finger is $\frac{1}{16}$ of an inch in diameter and the interfinger spacing is $\frac{1}{4}$ of an inch between centers. The tips of the finger desirably are tapered although they need not be brought to a sharp point. The fingers are imbedded in the bobbin.

Preferably, the zinc electrode is formed by casting, a satisfactory method being die casting.

Each finger 32 is covered with a film 40 (Fig. 14) which is so thin that it cannot be seen on the scale employed in Figs. 4 or 5. Said film is composed of a tough layer of any electrically non-conductive water-permeable material which will tightly adhere to the zinc and not be chemically attacked by the materials in the depolarizing mix. For example, methyl cellulose, carboxy methyl cellulose, gelatin starch or a natural gum can be employed. The film 40 is applied to the zinc fingers in any suitable manner as, for instance, by dipping or spraying. In operation of the cell, the film is penetrated by the electrolyte to establish an electric circuit between the zinc and carbon electrodes without shorting the cell.

The carbon electrode 26 is essentially similar in structure to the zinc electrode 28 and comprises a disc 34 of the same shape as the disc 30 and snugly fitted in the upper end of the sleeve 22 with its upper surface flush with the upper end of the sleeve. The under surface of said disc is flat against the top surface of the depolarizing bobbin 24. Projecting downwardly from the disc 34 and in one piece therewith are elongated slender fingers 36 tipped in the same manner as the zinc fingers 32. The carbon fingers are slightly shorter than the zinc fingers and, like the zinc fingers, are inbedded in the bobbin. The diameter of the carbon fingers is of the same order as that of the zinc fingers 32, that is to say, about 1/16 of an inch. The center to center spacing of the carbon fingers is 1/4 of an inch.

Each carbon finger is located between two adjacent zinc fingers and vice versa except at the periphery of the cell, the fingers being arranged to conjointly form a pattern of two sets of parallel lines at right angles to one another with the fingers at the intersection. With the foregoing relationship, the spacing between the fingers will be of about the same order as the diameters of the fingers.

It is to be understood that my invention is not to be limited to the foregoing relative diameters, that the spacing between said fingers may either exceed or be less than the diameters of the fingers, that the diameters of the fingers of each electrode may differ from one another and may differ from the diameter of the fingers of the other electrode, and that the fingers may be arranged in other patterns, e. g. a tessellated pattern, whose units are rhombuses or regular hexagons instead of squares.

For a reason which will be apparent hereinafter, I provide a central cylindrical extension 41 on the top of the carbon disc 34. This extension is of about the same diameter as the usual carbon rod in a flashlight battery.

The carbon electrode consists of particles of a graphitic nature such for instance as graphite or carbon black formed into the shape described above. Conveniently, the carbonaceous material can be so shaped by incorporating the same in a suitable carrier, for instance, a thermoplastic such as cellulose acetate or polystyrene. The graphitic particles are present in such a high proportion that the resistance of the carbon electrode is kept low. For example, the graphitic particles may be present in an amount by weight equal to the amount of the thermoplastic that acts as the carrier.

Where a thermoplastic is utilized to impart the required shape to the carbon electrode, said electrode conventionally can be fashioned by molding, e. g. injection molding, the graphitic particles being uniformly dispersed throughout the carrier.

If desired, the carbon electrode can be made from a plastic mass consisting of a mixture of pitch, tar and carbon particles such as presently is used in the manufactured of carbon rod electrodes. The mass is shaped to the desired contour, as by cold molding, and then is fired.

The tips of the zinc fingers terminate just short of the under surface of the carbon electrode. The tips of the carbon fingers terminate just short of the bottom surface of the bobbin. Said bottom surface of the bobbin is maintained spaced from the upper surface of the zinc electrode by a ring 38 caught between the bobbin and zinc disc and, with the other elements of the cell thus far described, nested within the sleeve 22.

The basic elements of the novel cell now will be seen to consist of a depolarizing bobbin having two spaced surfaces which preferably are flat and parallel to one another and a pair of electrodes including bodies located on different ones of the spaced surfaces and having elongated slender fingers extending into the bobbin with the fingers of one electrode interposed between those of the other. The cell elements are housed within the non-conductive sleeve 22.

To make the battery 20, the cell is inserted in a conventional sheath, for example, an open-ended jacket 42 of electrically non-conductive material, e. g. pasteboard, which extends from adjacent the bottom to above the top of the sleeve 22.

A protective sheet metal disc 44 has its rim formed into an annular downwardly facing channel 46 within which the inset upper edge 48 of the jacket is received and held by clamping to form a leak resistant joint. The metal disc 44 is provided with a large central aperture 50, the surrounding margin of said disc being seated on a paper washer 52 which rests on and insulates the disc from the outwardly extending base flange 54 of an inverted metal cup 56 that constitutes the conventional top terminal of the battery. Said cup receives the cylindrical extension 41. The diameter of the flange 54 is at least equal to and preferably is larger than the diameter of the aperture in the disc 44. The washer 52 is under compression between the disc and flange 54 so that a leak resistant joint is produced between the top terminal and the protective disc.

At the base of the battery, the jacket has an integral inwardly directed flange 58 which serves as a support for the bottom terminal. This terminal constitutes a sheet metal plate 60 of a material which is electropositive with respect to the carbon when all of the zinc in contact with the sheet metal plate is consumed. A typical material is copper or a copper-plated metallic substance. The plate 60 forms the bottom closure for the jacket. The peripheral edge of said plate is formed with an annular outwardly facing channel 62 which accommodates the flange 58 and is clenched thereon to provide a leak resistant joint. The under surface of the zinc disc 30 is seated on the plate 60 in electrical contact with the top wall of the channel 62.

It will be observed that the usual spaces are provided in the battery, one between the upper surface of the zinc disc and the lower surface of the bobbin, another between the lower surface of the zinc disc and the upper surface of the plate 60 and another above the carbon disc. These provide room into which products formed upon exhaustion or severe drain of the battery may be accommodated.

In Figs. 6 through 13, I have illustrated a method and apparatuses which may be employed for the manufacture of an individual cell, that is to say, a cell before it is sheathed to form a battery.

The bobbins 24 may be fabricated by forcing the plastic depolarizing mix from an extrusion machine 64 (Fig. 6) in the shape of a cylinder 66. A shearing mechanism 68 constituting, for example, an anvil 70 and a transversely reciprocating blade 72 cuts off bobbin slugs 74 at regular intervals. Preferably, the shearing mechanism constitutes a flying shear. Alternatively, the bobbin slugs can be formed in a molding machine or in any other suitable apparatus.

A bobbin slug 74 is located in the sleeve 22 and the zinc and carbon fingers 32, 36 are imbedded in the slug by a machine 76. Figs. 8 and 9 show the machine during insertion and location of a slug.

The machine includes a plug 78 which is vertically reciprocated in any suitable manner as, for example, by cams (not shown). The upper end of the plug is annularly grooved as at 80 to provide a seat 82. The machine is of the dial type, the plug 78 being located at the first station. When the plug is in raised position, a sleeve 22 is placed end down thereon and a spacing ring 38 inserted therein. The ring is pushed down until it touches the top of the plug 78. In this position, the ring is properly spaced from the lower end of the sleeve.

While the sleeve still is at the first station, a set of clamps 84, e. g. three fingers (Fig. 10), which move from station to station are shifted radially inwardly by cams 85 (Fig. 11) to engage the outer surface of the sleeve in the plane of the spacing ring 38. The clamps bite slightly into the sleeve (Fig. 9) and thereby firmly engage the ring through the sleeve whereby to fix the position of the ring.

Before or after the ring is thus engaged, but after the ring has been seated against the plug, a bobbin slug 74 which has been introduced into the sleeve is forced down against the spacing ring. Like the placement of the sleeve on the plug and the positioning of the spacing ring in the sleeve, the insertion of the slug can be carried out at the first station, although it will be apparent that if production is to be speeded up, said operations can be carried out at successive stations.

After the ring and bobbin have been properly located in the sleeve and while the ring and sleeve are held by the clamps 84, said clamps move the assembly to another station illustrated in Figs. 11 to 13 at which the electrode fingers are imbedded in the bobbin. The imbedding station includes upper and lower rams 88, 90 respectively, each of which is adapted to be reciprocated toward and away from a bobbin slug at the imbedding station. The upper ram is designed to detacably engage and hold a carbon electrode 26 and the lower ram is adapted to detachably engage and hold a zinc electrode 28.

For the foregoing purpose, each ram is provided with a set of spring fingers 92 that are adapted to frictionally engage notches 94 in the peripheries of the electrodes. The engagement is sufficiently firm to secure the electrodes to the rams during imbedding movement, but light enough to permit disengagement when the rams move away from the bobbin after having imbedded the electrodes therein.

At the imbedding station, a sleeve 22 with a nested ring and bobbin slug is held between the retracted two rams. A carbon electrode is inserted in the upper ram and a zinc electrode in the lower ram. The machine then presses the rams toward the bobbin while the clamps 84 hold the spacing ring stationary and thereby maintain the bobbin in a fixed position. As the rams move toward the sleeve, the electrode fingers will penetrate the bobbin slug and become imbedded therein as described hereinabove. The rams are not only axially aligned but are in predetermined relative angular positions which are such as to cause the sundry fingers to be located within the bobbin in proper mutual relationship.

As the fingers are inserted into the bobbin slug, the slug will swell somewhat, this swelling being principally in an axial direction since the bobbin is restrained diametrically by the sleeve 22. The bobbin is of proper volume to occupy such a position in the sleeve after penetration of the fingers that the under surface of the carbon disc 34 will be seated against the top of the bobbin as the top of the carbon disc reaches a position in which it is substantially flush with the upper end of the sleeve.

After both electrodes are imbedded, the rams are retracted, disengaging automatically from the electrodes. Thereafter, the cell is moved to a discharge station where the clamps are disengaged. The finished cell thereafter is taken to other machines of standard types where the battery sheath and terminals are mounted.

It thus will be seen that there are provided a cell and method which achieve all the objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. A dry cell comprising a plastic depolarizing single bobbin having spaced parallel end surfaces and a pair of electrodes, each electrode having many elongated thin parallel fingers which are mutually spaced apart from one another throughout their lengths, the number of fingers on both said electrodes being substantially the same, all of said fingers being of substantially uniform transverse cross section throughout their lengths, the fingers of one electrode being parallel to the fingers of the other electrode, the fingers of both electrodes being arranged in the same regular tessellated pattern, the fingers of one electrode being uniformly interspaced between the fingers of the other electrode to form a second tessellated pattern of the same but finer design than the first-named tessellated patterns in which the distances between the fingers in the second tessellated pattern are half that of the distances between the fingers of the first tessellated patterns whereby the finger nearest any other finger is of a polarity opposite to that of such other finger, the fingers of one of said electrodes extending into said bobbin through one of said end surfaces and the fingers of the other electrode extending into said bobbin through the other of said end surfaces, each of said fingers extending almost all of the way through said bobbin so that said fingers are substantially overlapped.

2. A dry cell as set forth in claim 1 wherein one of the electrodes and its fingers are in one piece and are composed of zinc, wherein the other electrode and its fingers are in one piece and are composed of a synthetic resin carrier through which carbonaceous particles are uniformly and heavily dispersed, and wherein the bobbin includes a depolarizing composition, an electrolyte salt, water and graphitic particles.

3. A dry cell as set forth in claim 2 wherein the fingers of the zinc electrode are covered by a tough water permeable solid impermeable film in intimate and direct contact with said fingers over the entire lengths thereof.

4. A dry cell as set forth in claim 2 wherein the bobbin is cylindrical, wherein an electrically non-conductive sleeve is provided in which the bobbin is snugly telescoped with the parallel opposite surfaces thereof adjacent and spaced inwardly from the ends of the sleeve, and wherein each of the electrodes includes a body from which the fingers extend, said bodies being located adjacent the opposite ends of the sleeve, the body of the carbon electrode contacting one of the said surfaces of the bobbin and the body of the zinc electrode being slightly spaced from the other said surface of the bobbin.

5. In a method of making a Leclanche dry cell, that improvement including the steps of forming a solid homogeneous imperforate plastic depolarizing slug, snugly inserting the slug in an electrically non-conductive sleeve, and simultaneously forcing into said slug from the opposite ends thereof the elongated thin fingers of two sets of electrodes to a degree such that said fingers substantially overlap one another, the fingers being so oriented during such insertion that the fingers of one set are uniformly interspaced between the fingers of the other set.

(References on following page)

References Cited in the file of this patent

UNITED STATES PATENTS

| | | |
|---|---|---|
| 358,386 | Crocker et al. | Feb. 22, 1887 |
| 369,505 | Drescher | Sept. 6, 1887 |
| 400,088 | Kammeyer | Mar. 26, 1889 |
| 402,166 | Kookogey | Apr. 30, 1889 |
| 532,826 | Schoenmehl | Jan. 22, 1895 |
| 1,415,873 | Hazelett | May 16, 1922 |
| 1,510,364 | Weissmann | Sept. 30, 1924 |
| 1,624,409 | Heise et al. | Apr. 12, 1927 |
| 2,307,371 | Hileman | Aug. 13, 1941 |
| 2,447,197 | May | Aug. 17, 1948 |
| 2,605,298 | Marsal | July 29, 1952 |
| 2,641,623 | Winckler | June 9, 1953 |

FOREIGN PATENTS

| | | |
|---|---|---|
| 300,913 | Italy | Sept. 21, 1932 |
| 41,383 | Holland | Aug. 16, 1937 |
| 110,708 | Australia | May 26, 1939 |